United States Patent
Chen et al.

(10) Patent No.: US 7,441,100 B2
(45) Date of Patent: Oct. 21, 2008

(54) PROCESSOR SYNCHRONIZATION IN A MULTI-PROCESSOR COMPUTER SYSTEM

(75) Inventors: Chenghung Justin Chen, San Jose, CA (US); John W. Curry, Union City, CA (US); Robert Seymour, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 849 days.

(21) Appl. No.: 10/789,732

(22) Filed: Feb. 27, 2004

(65) Prior Publication Data

US 2005/0193148 A1 Sep. 1, 2005

(51) Int. Cl.
*G06F 15/00* (2006.01)
*G06F 15/76* (2006.01)

(52) U.S. Cl. ............................. 712/40; 712/10; 712/16
(58) Field of Classification Search ................ 712/40
See application file for complete search history.

(56) References Cited

U.S. PATENT DOCUMENTS 5,434,995 A * 7/1995 Oberlin et al. ............. 713/375
5,887,167 A * 3/1999 Sutton ........................ 719/314
6,735,760 B1 * 5/2004 Dice ........................... 717/139

OTHER PUBLICATIONS

Johnson et al.; Cyclical Cascade Chains: A Dynamic Barrier Synchronization Mechanism for Multiprocessor Systems; 2001; IEEE; pp. 1-8.*

* cited by examiner

*Primary Examiner*—Eddie P Chan
*Assistant Examiner*—Corey S Faherty

(57) ABSTRACT

A method for synchronizing a plurality of processors of a multi-processor computer system on a synchronization point is disclosed. The method includes triggering a first set of processors, using a lead processor of the plurality of processors when the lead processor encounters the synchronization point, to enter an exit holding loop. The first set of processors representing the plurality of processors except the lead processor. The triggering the first set of processors is performed without accessing a shared memory area of the multi-processor system. There is also included triggering the plurality of processors, using a tail processor of the plurality of processors when the tail processor encounters the synchronization point, to leave the exit holding loop. The triggering the plurality of processors is performed without accessing the shared memory area of the multi-processor system.

21 Claims, 5 Drawing Sheets

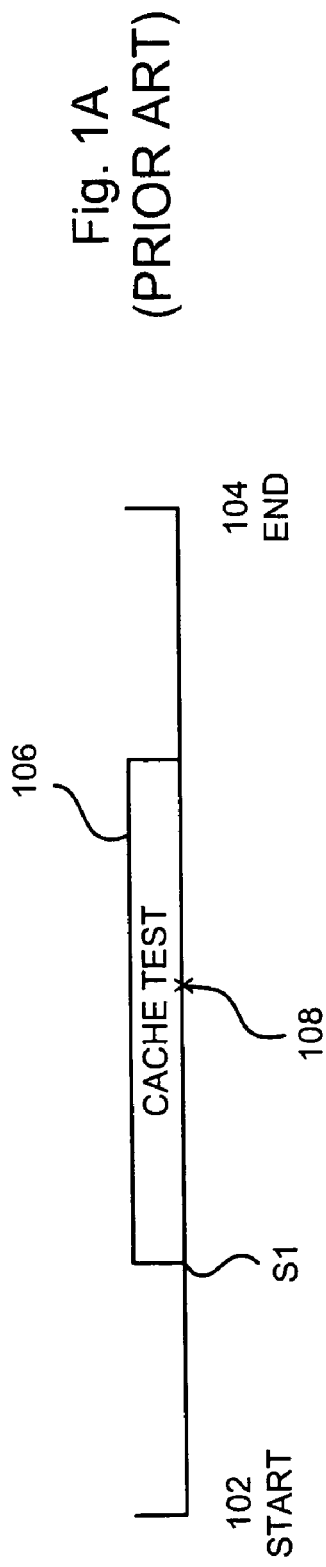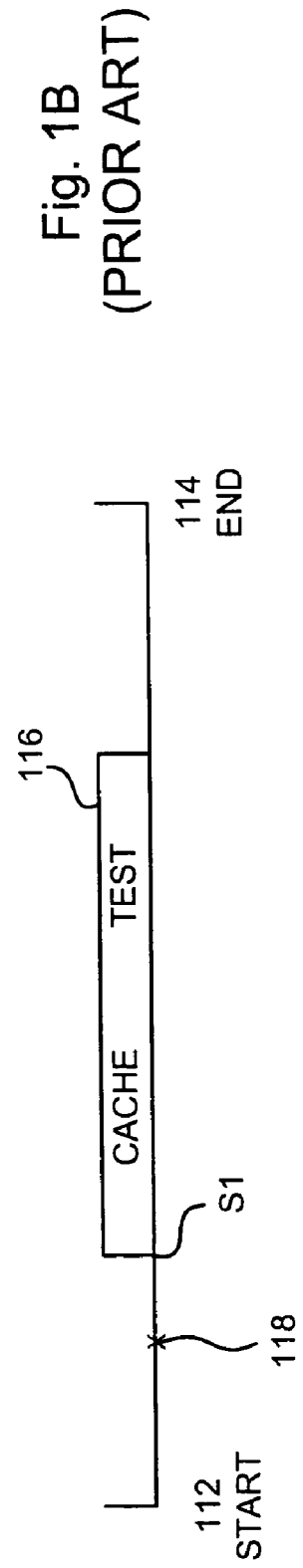

PROCESSOR SYNCHRONIZATION IN A MULTI-PROCESSOR COMPUTER SYSTEM

BACKGROUND OF THE INVENTION

In some multi-processor computer systems, there is sometimes a need to synchronize the processors. For example, a multi-processor computer system (MPCS) may periodically execute a diagnostic program to ensure that the MPCS is functioning properly. A part of the diagnostic may involve testing the memory caches associated with the MPCS's multiple processors. During memory cache testing for a given processor, it is may be required that the cache state of that processor does not change during the memory cache test. Unless the processors are synchronized prior to the memory cache test, the cache state of the memory cache associated with a given processor may unexpectedly change if another processor accesses main memory and, for example, writes to the data being cached by the given processor.

To facilitate discussion, considering the diagram of FIGS. 1A and 1B. The diagrams of FIG. 1A and FIG. 1B may represent different instantiations of a single diagnostic program being executed by a processor A and a processor B respectively, for example. In FIG. 1A, instructions of the diagnostic program are represented by the horizontal line between START (102) and END (104), with the shaded portion CACHE TEST (106) representing the cache test instructions. During the execution of CACHE TEST (106) instructions by a given processor A, it is required that the cache state of processor A be unchanged.

In FIG. 1B, instructions of the diagnostic program is again represented by the horizontal line between START (112) and END (114), with the shaded portion CACHE TEST (116) representing the cache test instructions. During the execution of CACHE TEST (116) by a given processor B, it is required that the cache state of processor B also be unchanged.

Suppose that the processors are not synchronized prior to starting their respective cache tests. If processor A is currently executing an instruction 108 within CACHE TEST (106), and processor B is currently executing an instruction 118 outside of CACHE TEST (116), the cache state of processor A may change due to memory access by processor B. This is because some memory controller may flush the caches of all processors currently caching a data item if one of the processors accesses that data item in main memory for writing, for example. When this happens, the diagnostic test being executed for processor A may provide an incorrect result, such as indicating a failure with its cache even though the cache may, in reality, be error-free.

SUMMARY OF INVENTION

The invention relates, in an embodiment, to a method for synchronizing a plurality of processors of a multi-processor computer system on a synchronization point. The method includes triggering a first set of processors, using a lead processor of the plurality of processors when the lead processor encounters the synchronization point, to enter an exit holding loop. The first set of processors representing the plurality of processors except the lead processor. The triggering the first set of processors is performed without accessing a shared memory area of the multi-processor system. There is also included triggering the plurality of processors, using a tail processor of the plurality of processors when the tail processor encounters the synchronization point, to leave the exit holding loop. The triggering the plurality of processors is performed without accessing the shared memory area of the multi-processor system.

In another embodiment, the invention relates to an article of manufacture comprising a program storage medium having computer readable code embodied therein, the computer readable code being configured to synchronize a plurality of processors of a multi-processor computer system on a synchronization point. There is included computer readable code for triggering a first set of processors, using a lead processor of the plurality of processors when the lead processor encounters the synchronization point, to enter an exit holding loop. The first set of processors represents the plurality of processors except the lead processor. The triggering the first set of processors is performed without accessing a shared memory area of the multi-processor system. There is also included computer readable code for triggering the plurality of processors, using a tail processor of the plurality of processors when the tail processor encounters the synchronization point, to leave the exit holding loop. The triggering the plurality of processors is performed without accessing the shared memory area of the multi-processor system.

In yet another embodiment, the invention relates to a method for synchronizing a plurality of processors of a multi-processor computer system on a synchronization point in instantiations of a computer program. There is included implementing a circular reference arrangement for the plurality of processors, each of the plurality of processors having an immediately preceding processor and an immediately succeeding processor, one of the plurality of processors being designated the lead processor, another one of the processors being designated the tail processor, the lead processor immediately succeeding the tail processor in the circular reference arrangement. There is also included keeping a first set of processors in an entry holding loop when the processors of the first set of processors reach the synchronization point. The first set of processors represents the plurality of processors except the lead processor. There is further included cascade triggering along the circular reference arrangement the first set of processors, using a lead processor of the plurality of processors when the lead processor encounters the synchronization point, to enter an exit holding loop. The cascade triggering the first set of processors is performed without accessing a shared memory area of the multi-processor system. There is also included keeping the lead processor in the exit holding loop. Additionally, there is included cascade triggering along the circular reference arrangement the plurality of processors, using a tail processor of the plurality of processors when the tail processor encounters the synchronization point, to leave the exit holding loop. The cascade triggering the plurality of processors is performed without accessing the shared memory area of the multi-processor system.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A and FIG. 1B are prior art diagrams showing two different instantiations of a single diagnostic program being executed by two different processors.

DETAILED DESCRIPTION OF DETAILED EMBODIMENTS

Figure 2A:
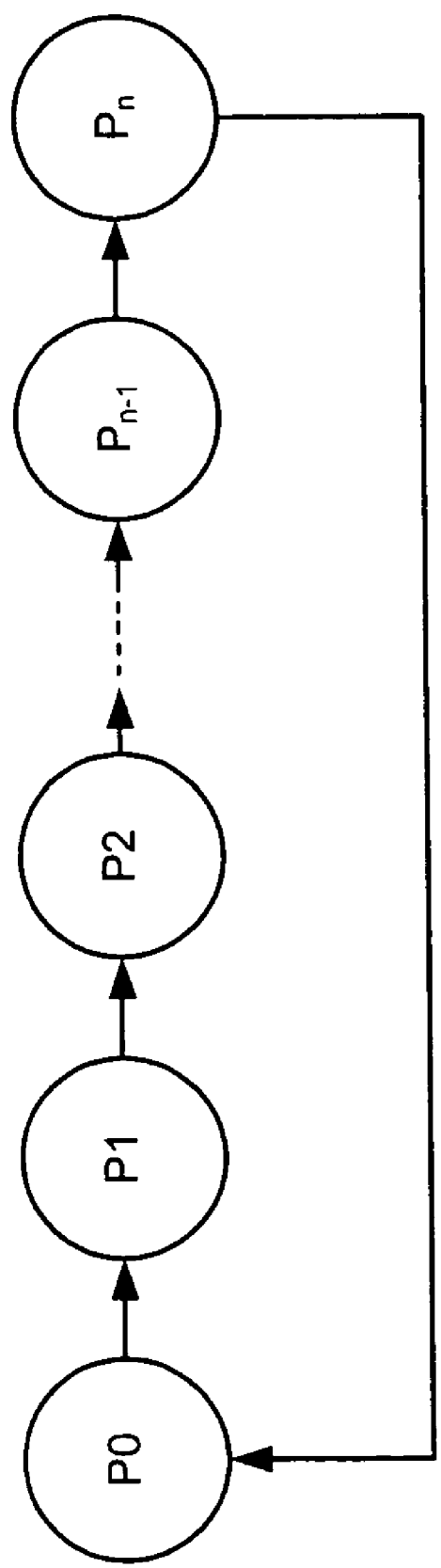
FIG. 2A illustrates, in accordance with an embodiment of the present invention, a circular linked list of processors, representing the circular reference arrangement that the processors to be synchronized are put on to facilitate synchronization.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with embodiments of the present invention, there are provided techniques for synchronizing processors of a multi-processor computer system (MPCS) on an instruction or a group of instructions (referred to herein as a synchronization point). Embodiments of the invention synchronize the processors in a manner that does not require memory access during synchronization. As such, the techniques proposed are highly suitable for synchronizing processors to avoid cache coherency problems, such as the problem described earlier.

In an embodiment, the processors communicate among themselves to synchronize using a masked interrupt approach. In a conventional interrupt-driven approach, the processor being interrupted typically jumps to a predefined routine in memory to service the interrupt. Interrupt servicing in this manner, however, involves memory access and is undesirable for the purpose at hand, i.e., synchronization among the processors without memory access. The interrupt mask approach employs an interrupt mask bit, which is provided in many processor architectures, in order to mask (or disable) the interrupt servicing. Alternatively or additionally, a processor may employ an interrupt request status register in order to ascertain whether an interrupt has been received. In some processor architectures, the interrupt request status register logs the received interrupt request (irrespective whether servicing is done). Thus, even though an interrupt is received and logged, no interrupt service routine is invoked and consequently no memory access is undertaken.

In an embodiment, the processors are put on a circular linked list, with one processor being designated a lead processor and another processor being designated a tail processor. The synchronization routine includes two holding loops: an entry holding loop and an exit holding loop.

If any processor reaches the synchronization point in the program before all of its preceding processors have reached the synchronization point, it enters an entry holding loop. When the lead processor reaches the synchronization point, it triggers the other processors to exit the first entry holding loop in a cascading manner starting with the processor immediately succeeding the lead processor and ending with the tail processor using the sequence established by the circular linked list. In this manner, the tail processor exits the entry holding loop after all of its preceding processors have reached the synchronization point and each of its preceding processors has triggered its respective immediately succeeding processor to leave the entry holding loop.

Once a processor leaves the entry holding loop, it enters the exit holding loop. The exit holding loop is provided to prevent a processor from leaving the synchronization routine before all processors have reached the synchronization point. For example, there may be a substantial time gap between the time a given processor leaves its entry holding loop and the time the tail processor can leave its entry holding loop. This may happen if, for example, one of the processors in the sequence between the given processor and the tail processor was late in reaching the synchronization point, preventing the cascade triggering to reach the tail processor in a rapid manner.

Using the previous cache test example, if there is no exit holding loop, the given processor would be able to move forward with the cache test while one of its succeeding processors in the sequence may, not having reached the synchronization point, still be accessing memory. This situation would cause a cache coherence issue with the cache test of the given processor, which is an undesirable result.

The lead processor enters the exit holding loop after having triggered its immediately succeeding processor to leave its entry holding loop. Succeeding processors of the lead processor also enter their own exit holding loop once they are triggered to leave their own entry holding loop in the cascading manner discussed earlier. After the tail processor is triggered to leave its entry holding loop, it triggers all of the processors to leave their exit holding loops, starting with the lead processor and cascading toward the tail processor. Thus, after all processors reach the synchronization point (as evidenced by the tail processor being able to trigger other processors to leave their exit holding loops), processors can begin leaving their exit holding loops. The processors can depart their exit loops in parallel or via cascade triggering. The departure from the exit holding loop also represents the end of the synchronization routine for a processor. From this point on, all processors can move forward after having been synchronized at the synchronization point (e.g., point S1 in FIGS. 1A and 1B).

The features and advantages of the present invention may be better understood with reference to the figures and discussions that follow. FIG. 2A illustrates, in accordance with an embodiment of the present invention, a circular linked list of processors, representing the circular reference arrangement that the processors to be synchronized are put on to facilitate synchronization. In this circular reference arrangement, each processor has an immediately preceding processor and an immediately succeeding processor. For example, processor $P_1$ has processor $P_0$ as its immediately preceding processor and processor $P_2$ as its immediately succeeding processor. One of the processors is designated the lead processor (e.g., $P_0$), and the processor that is the last succeeding processor of the lead processor is designated the tail processor (e.g., $P_n$). Since the reference arrangement is circular, the tail processor $P_n$ acts as the immediately preceding processor to the lead processor $P_0$. Once the processors to be synchronized are put on a circular reference arrangement, synchronization can begin.

Figure 2B:
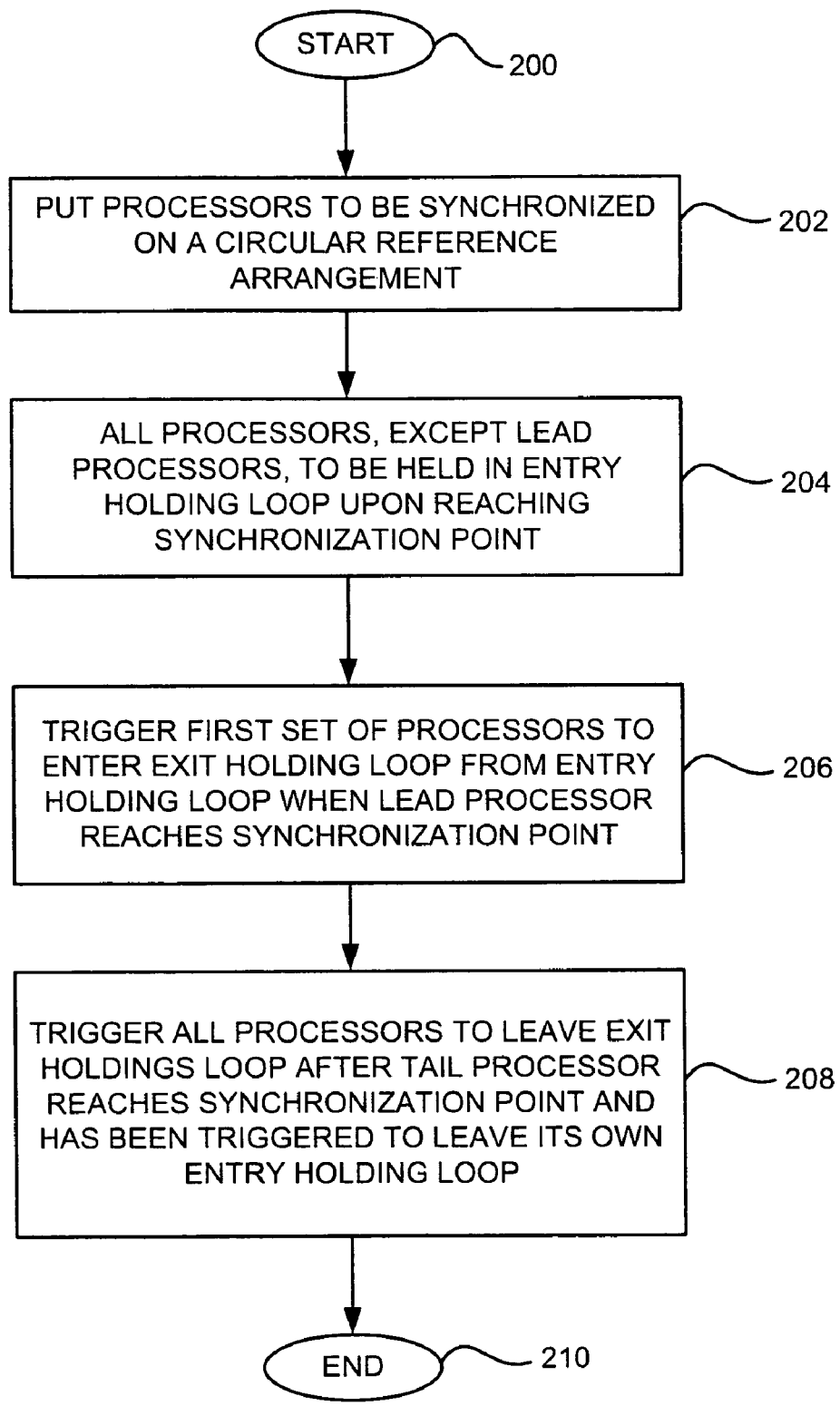
FIG. 2B illustrates, in accordance with an embodiment, the steps for synchronizing multiple processors of a multi-processor computer system (MPCS) on a synchronization point.

FIG. 2B illustrates, in accordance with an embodiment, the steps for synchronizing multiple processors of a multi-processor computer system (MPCS) on a synchronization point.

In step 202, the processors to be synchronized are put on a circular reference arrangement, such as the circular linked list depicted in FIG. 2A. In step 204, each processor to be synchronized, except the lead processor, enters its own entry holding loop upon reaching the synchronization entry point.

In step 206, each processor to be synchronized is triggered by its immediately preceding processor in a cascading manner to leave its entry holding loop, starting with the triggering by the lead processor for its immediately succeeding processor to leave its entry holding loop. In an embodiment, the triggering is performed by processor-to-processor communication or by another technique that does not involve accessing the shared memory area (such as main memory) of the MPCS. In an embodiment, the triggering is performed by writing to an external interrupt request associated with the immediately succeeding processor using the immediately succeeding processor's hard physical address (HPA). The immediately succeeding processor can subsequently check that external interrupt request bit or register to ascertain whether a triggering signal has been received. Since the system's interrupt handler code may cause a memory access, the interrupt may be masked.

Except for the lead processor, a given processor triggers for its succeeding processor to leave the succeeding processor's entry holding loop after that given processor has reached the synchronization point and has been triggered by its preceding processor to leave the given processor's own entry holding loop.

The cascade triggering continues until the tail processor leaves its entry holding loop. Once a processor leaves its entry holding loop, it enters its own exit holding loop.

In step 208, each processor to be synchronized is triggered by its immediately preceding processor in a cascading manner to leave its exit holding loop, starting with the triggering by the tail processor for the lead processor to leave its exit holding loop. In an embodiment, this triggering is accomplished by writing to another external interrupt request or register associated with the immediately succeeding processor. Again, the triggering is performed using a technique that does not involve accessing the system's shared memory. Note that the tail processor triggers to the lead processor to leave the exit holding loop after the tail processor reaches the synchronization point and has been triggered to leave its own entry holding loop by its immediately preceding processor.

Further, a given processor triggers for its immediately succeeding processor to leave the immediately succeeding processor's exit holding loop after that given processor has been triggered by its immediately preceding processor to leave the given processor's own exit holding loop. The cascade triggering continues until the tail processor leaves its exit holding loop.

Figure 3:
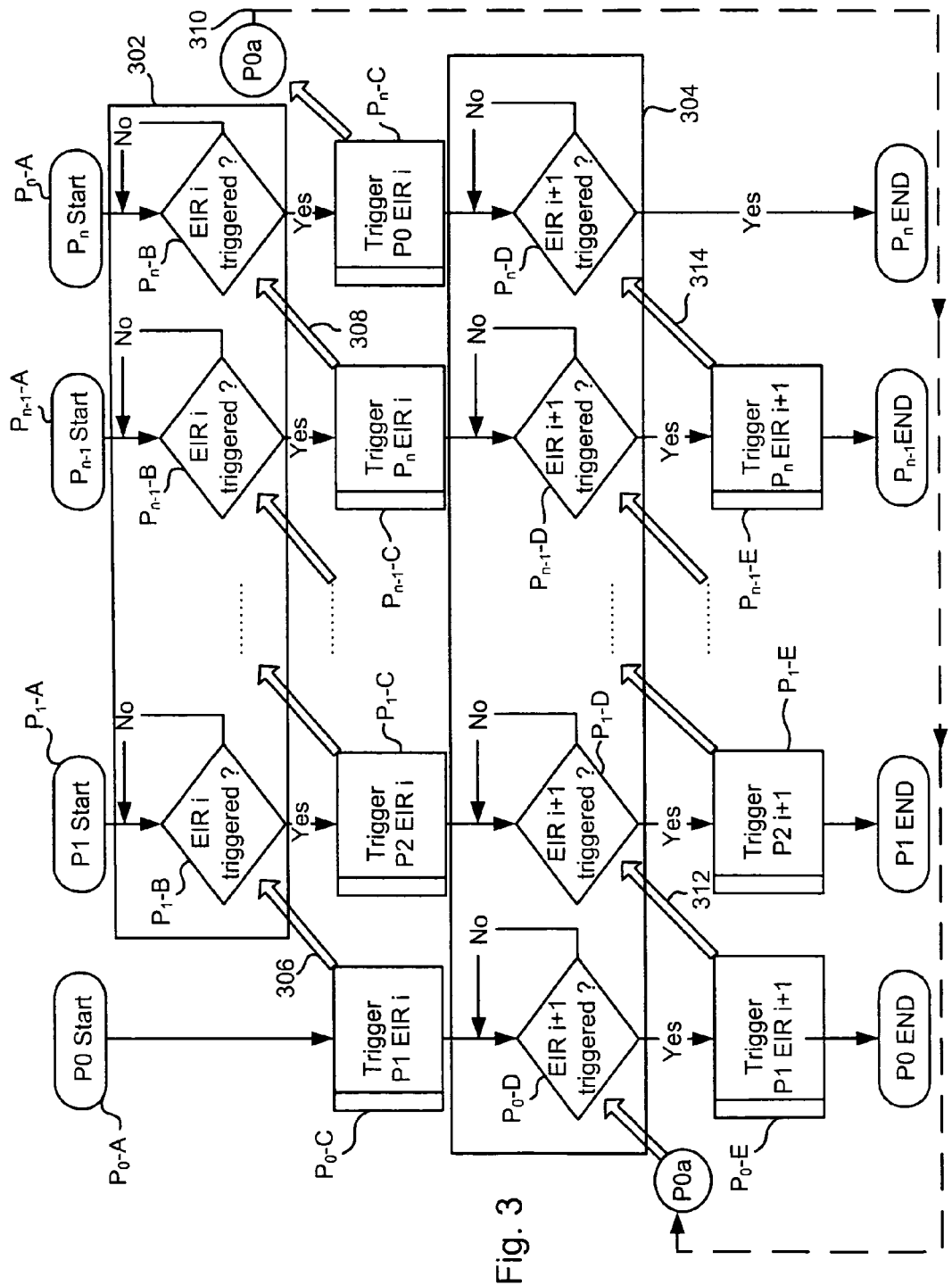
FIG. 3 illustrates in greater detail, in accordance with an embodiment, the steps for synchronizing multiple processors of a multi-processor computer system (MPCS) on a synchronization point.

FIG. 3 illustrates in greater detail, in accordance with an embodiment, the steps for synchronizing multiple processors of a multi-processor computer system (MPCS) on a synchronization point. In FIG. 3 and the subsequent FIG. 4, $EIR_i$ represents the interrupt that, if triggered by an immediately preceding processor, would cause a processor to exit its entry holding loop. $EIR_{i+1}$ represents the interrupt that, if triggered by an immediately preceding processor, would cause a processor to exit its exit holding loop.

Prior to synchronization, the processors to be synchronized are put on a circular reference arrangement in the manner discussed earlier. The entry holding loops for all processors, except the lead processor $P_0$, is shown in box 302. The exit holding loops all processors is shown in box 304.

In FIG. 3, each of the processors to be synchronized, except the lead processor $P_0$, is put into its own entry holding loop after reaching the synchronization point. Thus, processor $P_1$ is put into entry holding loop $P_{1-B}$, processor $P_{n-1}$ is put into entry holding loop $P_{n-1}$-B, and processor $P_n$ is put into entry holding loop $P_n$-B upon reaching the synchronization point. In the entry holding loop, a processor continues to check whether it has been triggered (by checking its interrupt request status register, for example) by its immediately preceding processor. In the PA-RISC architecture, the checking may employ, for example, the EIR register. When the lead processor $P_0$ reaches its synchronization point, it triggers (block $P_0$-C) via arrow 306 for its immediately succeeding processor $P_1$ to leave its entry holding loop ($P_1$-B).

Lead processor $P_0$ then enters its exit holding loop $P_0$-D. Once processor $P_1$ leaves its entry holding loop $P_1$-B, it in turn triggers (block $P_1$-C) for its immediately succeeding processor to leave the immediately succeeding processor's entry holding loop. Processor $P_1$ then enters its own exit holding loop $P_1$-D.

The triggering cascades in sequence until the tail processor $P_n$ is triggered (via arrow 308) by its immediately preceding processor $P_{n-1}$ to leave its own entry holding loop $P_n$-B. Note that a processor, except the lead processor $P_0$, does not leave its entry holding loop until all of its preceding processors have arrived at the synchronization point and have left their own entry holding loops. Also note that each processor enters its own exit holding loop after it has sent the triggering signal to its succeeding processor to leave the succeeding processor's entry holding loop.

In the exit holding loop, a processor continues to check whether it has been triggered (by checking the interrupt request status register, for example) by its immediately preceding processor. Once the tail processor $P_n$ is triggered to leave its entry holding loop $P_n$-B, it sends a triggering signal to lead processor $P_0$ (via arrow 310) to trigger lead processor $P_0$ to leave its exit holding loop $P_0$-D. Upon exiting, lead processor $P_0$ in turn triggers (via arrow 312) its immediately succeeding processor $P_1$ to leave its exit holding loop $P_1$-D. The sequence of triggering cascades until the tail processor $P_n$ is triggered (via arrow 314) by its immediately preceding processor $P_{n-1}$ to leave its own exit holding loop $P_n$-D. The exit from the exit holding loop represents the end of the synchronization sequence for a processor. This is represented in FIG. 3 by states $P_0$-End, $P_1$-End, $P_{n-1}$-End, and $P_n$-End.

Figure 4:
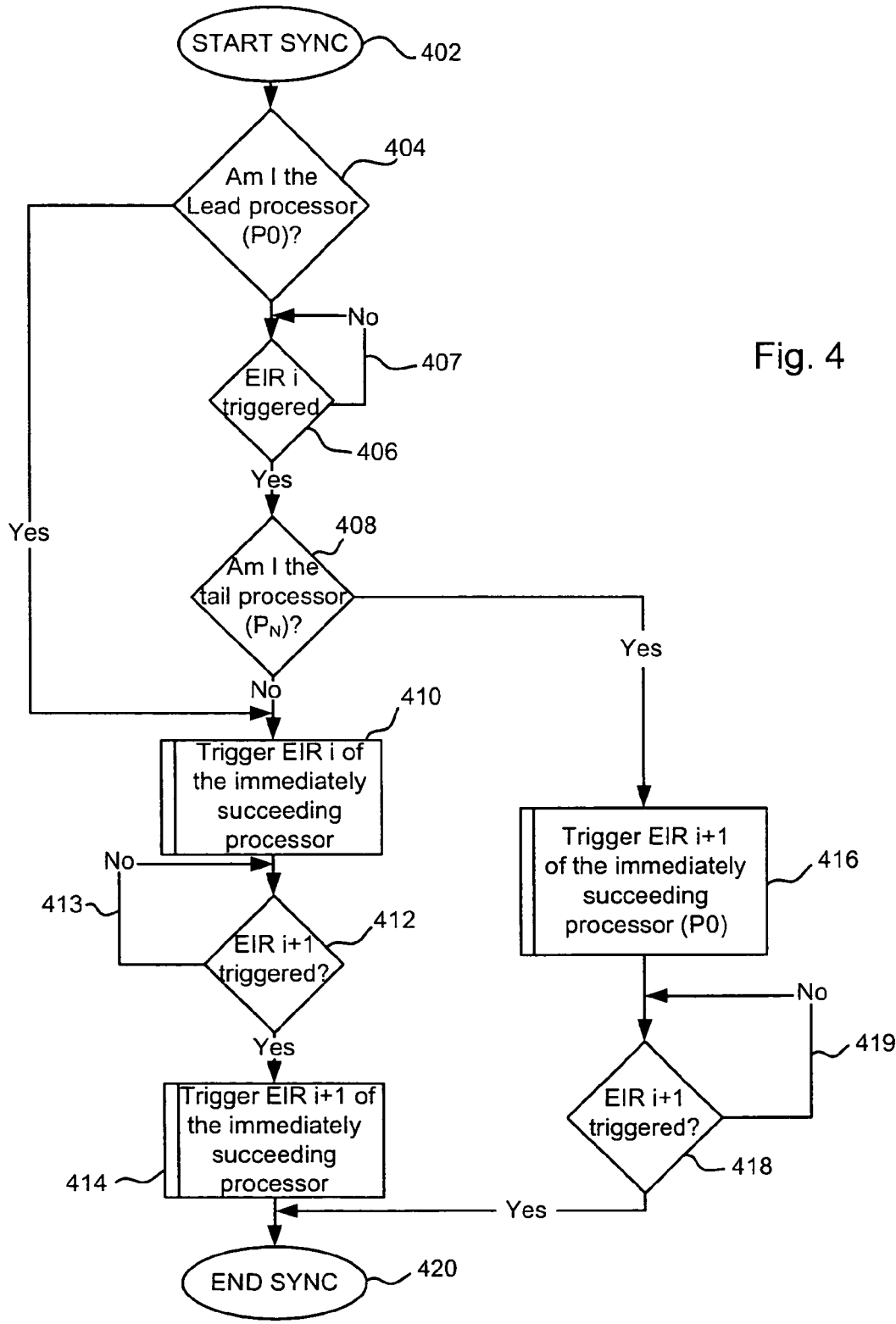
FIG. 4 illustrates in greater detail, in accordance with an embodiment, the steps performed by each processor for synchronizing multiple processors of a multi-processor computer system (MPCS) on a synchronization point.

FIG. 4 illustrates in greater detail, in accordance with an embodiment, the steps performed by each processor for synchronizing multiple processors of a multi-processor computer system (MPCS) on a synchronization point. Prior to synchronization, the processors to be synchronized are put on a circular reference arrangement in the manner discussed earlier. In step 402, synchronization starts for a processor when that processor encounters the synchronization point.

In step 404, the processor inquires whether it is the lead processor $P_0$. If it is not, this processor ascertains in step 406 whether its immediately preceding processor has sent a triggering signal to it. Note that the immediately preceding processor sends a triggering signal after it and all of its preceding processors have reached the synchronization point and after the immediately preceding processor has been triggered by that immediately preceding processor's immediately preceding processor. For example, a processor $P_3$ is triggered by processor $P_2$ after processors $P_2$, $P_1$ and $P_0$ have reached the synchronization point and after processor $P_2$ has been triggered by processor $P_1$ (which happens after processor $P_1$ itself has been triggered by lead processor $P_0$).

If it is ascertained in step 406 that this processor has not been sent a triggering signal by its immediately preceding processor, the processor stays in the loop (as represented by arrow 407 returning to step 406). On the other hand, if it is ascertained in step 406 that this processor has been sent a triggering signal by its immediately preceding processor, the processor leaves the entry holding loop and proceeds to step 408.

In step 408, the processor ascertains whether it is the tail processor $P_n$. If it is not the tail processor $P_n$, the processor proceeds to step 410 to send a triggering signal (e.g., using the external interrupt request or EIR mechanism in an embodiment) to its immediately succeeding processor to enable the immediately succeeding processor to leave its own entry holding loop. Note that if the processor is the lead processor $P_0$ (as ascertained in step 404), that processor proceeds directly to step 410.

Thereafter, the processor proceeds to step 412 wherein an inquiry is made as to whether the processor has been sent a triggering signal by its immediately preceding processor to allow it to leave the exit holding loop. If the triggering signal has not been received (as ascertained in step 412), the processor enters an exit holding loop as shown by arrow 413. On the other hand, if the triggering signal has been received from its immediately preceding processor to allow it to leave the exit holding loop, the processor proceeds to step 414 wherein it in turn triggers for its immediately succeeding processor to leave its exit holding loop. Thereafter, the synchronization routine ends for the processor (420).

On the other hand, if it is ascertained in step 408 that it is the tail processor $P_n$, that tail processor $P_n$ proceeds to step 416 to send a triggering signal (e.g., using the external interrupt request or EIR mechanism in an embodiment) to its immediately succeeding processor to enable the immediately succeeding processor to leave its own exit holding loop. In this case, the triggering signal is sent to the lead processor $P_0$ to enable the lead processor $P_0$ to leave its own exit holding loop. Thereafter, the tail processor $P_n$ proceeds to step 418 wherein an inquiry is made as to whether the tail processor $P_n$ has been sent a triggering signal by its immediately preceding processor $P_{n-1}$ to allow it to leave the exit holding loop.

If the triggering signal has not been received (as ascertained in step 418), the tail processor $P_n$ enters an exit holding loop as shown by arrow 419. On the other hand, if the triggering signal has been received from its immediately preceding processor $P_{n-1}$ to allow tail processor $P_n$ to leave the exit holding loop, tail processor $P_n$ proceeds to step 420 wherein the synchronization routine ends for the tail processor $P_n$. Once synchronization ends for tail processor $P_n$, all processors have exited the synchronization routine.

As can be appreciated from the foregoing, embodiments of the invention allow processors of a multi-processor computer system (MPCS) to be synchronized on a synchronization point without accessing memory. The use of two holding loops ensures that all processors to be synchronized arrive at the synchronization point before any processor is allowed to leave the synchronization routine. In other words, any task-involving memory access would have been completed by all processors before any processor is allowed to leave the synchronization routine to begin the task that requires prior synchronization. Additionally, the resources involved are low, thereby rendering the synchronization technique highly efficient. In an embodiment, two external interrupt request bits (and one internal scratch register to save the HPA of the immediately succeeding processor) may be required in each processor.

Although the examples herein discuss the use of a circular linked list as the circular reference arrangement, any data structure for tracking circular referencing of the processors can be employed. As can be seen from the foregoing, there is no limit to the number of processors that can be synchronized using techniques discussed in embodiments of the invention. Further, there is no need to synchronize all processors of the MPCS. Any subset of processors (from two to the maximum number of processors in the MPCS) can be put on the circular reference arrangement to undergo synchronization.

While this invention has been described in terms of several embodiments, there are alterations, permutations, and equivalents which fall within the scope of this invention. For example, although the examples herein show that the processors can be triggered in a cascade manner to leave their exit holding loops, the processors can also leave their exit holding loops in a parallel manner. For example, if there is provided a mechanism for broadcasting the interrupt request, the tail processor can employ such a mechanism to signal to all processors to leave their exit holding loops in a substantially parallel manner. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of synchronizing a plurality of processors of a multi-processor computer system on a synchronization point, said method comprising:

creating a circular reference arrangement for said plurality of processors, wherein a first processor from among said plurality of processors is designated said lead processor and a second processor from among said plurality of processors is designated said tail processor, and wherein said lead processor is adjacent to said tail processor in said circular reference arrangement;

triggering a first set of processors to enter an entry holding loop in response to said first set of processors encountering said synchronization point before said lead processor associated with said plurality of processors;

triggering said first set of processors to enter an exit holding loop in response to said lead processor encountering said synchronization point, said first set of processors entering said exit holding loop in a cascading manner starting with said lead processor following a sequence established by said circular reference arrangement, with each processor of said first set of processors being triggered by its immediate predecessor in said sequence; and triggering said plurality of processors to leave said exit holding loop in response to said tail processor associated with said plurality of processors encountering said synchronization point, said plurality of processors leaving said exit holding loop in a cascading manner starting with said tail processor following said sequence established by said circular reference arrangement, with each processor of said plurality of processors being triggered by its immediate predecessor in said sequence.

2. The method of claim 1 wherein said creating said circular reference arrangement for said plurality of processors, wherein said first processor is designated said lead processor and said second processor is designated said tail processor, and wherein said lead processor is adjacent to said tail processor in said circular reference arrangement, further comprises:

creating said circular reference arrangement for said plurality of processors, wherein said first processor is designated said lead processor and said second processor is designated said tail processor, and wherein said lead processor is adjacent to said tail processor in said circular reference arrangement, said circular reference arrangement representing a circular linked list.

3. The method of claim 1 wherein said triggering said plurality of processors to leave said exit holding loop in response to said tail processor encountering said synchronization point further comprises:
triggering said plurality of processors to leave said exit holding loop in response to said tail processor encountering said synchronization point, said plurality of processors leaving said exit holding loop in a cascading manner starting with said tail processor following said sequence established by said circular reference arrangement, with each processor of said plurality of processors being triggered by its immediate predecessor in said sequence.

4. The method of claim 1, further comprising:
employing first external interrupt mechanism associated with each of said first set of processors.

5. The method of claim 4 further comprising:
writing to hard physical addresses of each of said first set of processors.

6. The method of claim 4, further comprising:
employing a second external interrupt mechanism associated with each of said plurality of processors.

7. The method of claim 6 further comprising:
writing to hard physical addresses of each of said plurality of processors.

8. The method of claim 1 wherein said triggering said first set of processors to enter said exit holding loop in response to said lead processor encountering said synchronization point further comprises:
triggering said first set of processors to enter said exit holding loop in response to said lead processor encountering said synchronization point utilizing a masked interrupt approach.

9. An article of manufacture comprising a program storage medium having computer readable code embodied therein, wherein executing said computer readable code causes a computer to implement a method of synchronizing a plurality of processors on a synchronization point, said method comprising:
creating a circular reference arrangement for said plurality of processors, wherein a first processor from among said plurality of processors is designated said lead processor and a second processor from among said plurality of processors is designated said tail processor, and wherein said lead processor is adjacent to said tail processor in said circular reference arrangement;
triggering a first set of processors to enter an entry holding loop in response to said first set of processors encountering said synchronization point before said lead processor associated with said plurality of processors;
triggering said first set of processors to enter an exit holding loop in response to said lead processor encountering said synchronization point, said first set of processors entering said exit holding loop in a cascading manner starting with said lead processor following a sequence established by said circular reference arrangement, with each processor of said first set of processors being triggered by its immediate predecessor in said sequence; and
triggering said plurality of processors to leave said exit holding loop in response to said tail processor encountering said synchronization point, said plurality of processors leaving said exit holding loop in a cascading manner starting with said tail processor following said sequence established by said circular reference arrangement, with each processor of said plurality of processors being triggered by its immediate predecessor in said sequence.

10. The article of manufacture of claim 9 wherein said creating said circular reference arrangement for said plurality of processors, wherein said first processor is designated said lead processor and said second processor is designated said tail processor, and wherein said lead processor is adjacent to said tail processor in said circular reference arrangement, further comprises:
creating said circular reference arrangement for said plurality of processors, wherein said first processor is designated said lead processor and said second processor is designated said tail processor, and wherein said lead processor is adjacent to said tail processor in said circular reference arrangement, said circular reference arrangement representing a circular linked list.

11. The article of manufacture of claim 9 wherein said method further comprises:
employing a first external interrupt mechanism associated with each of said first set of processors.

12. The article of manufacture of claim 11 wherein said method further comprises:
writing to hard physical addresses of each of said first set of processors.

13. The article of manufacture of claim 11 wherein said method further comprises:
employing a second external interrupt mechanism associated with each of said plurality of processors.

14. The article of manufacture of claim 13 wherein said method further comprises:
writing to hard physical addresses of each of said plurality of processors.

15. The article of manufacture of claim 9 wherein said method further comprises:
receiving trigger signals using a masked interrupt approach.

16. A method for synchronizing a plurality of processors of a multi-processor computer system on a synchronization point in instantiations of a computer program, comprising:
implementing a circular reference arrangement representing a circular linked list for said plurality of processors, each of said plurality of processors having an immediately preceding processor and an immediately succeeding processor, one of said plurality of processors being designated said lead processor, another one of said processors being designated said tail processor, said lead processor immediately succeeding said tail processor in said circular reference arrangement;
keeping a first set of processors in an entry holding loop when said processors of said first set of processors reach said synchronization point, said first set of processors representing said plurality of processors except said lead processor;
cascade triggering along said circular reference arrangement said first set of processors, using a lead processor of said plurality of processors when said lead processor encounters said synchronization point, to enter an exit holding loop, said cascade triggering said first set of processors being performed without accessing a shared memory area of said multi-processor system;
keeping said lead processor in said exit holding loop; and thereafter
cascade triggering along said circular reference arrangement said plurality of processors, using a tail processor of said plurality of processors when said tail processor encounters said synchronization point, to leave said exit holding loop, said cascade triggering said plurality of processors being performed without accessing said shared memory area of said multi-processor system.

17. The method of claim 16 wherein said cascade triggering said first set of processors employs a first external interrupt mechanism associated with each of said first set of processors.

18. The method of claim 17 wherein said cascade triggering said first set of processors includes writing to hard physical addresses of each of said first set of processors.

19. The method of claim 17 wherein said cascade triggering said plurality of processors employs a second external interrupt mechanism associated with each of said plurality of processors.

20. The method of claim 19 wherein said cascade triggering said plurality of processors includes writing to hard physical addresses of each of said plurality of processors.

21. The method of claim 16 wherein said cascade triggering employs a masked interrupt approach.

* * * * *

UNITED STATES PATENT AND TRADEMARK OFFICE
CERTIFICATE OF CORRECTION

PATENT NO. : 7,441,100 B2 Page 1 of 1
APPLICATION NO. : 10/789732
DATED : October 21, 2008
INVENTOR(S) : Chenghung Justin Chen et al.

It is certified that error appears in the above-identified patent and that said Letters Patent is hereby corrected as shown below:

In column 9, line 17, in Claim 4, after "employing" insert -- a --.

Signed and Sealed this

Twenty-fourth Day of March, 2009

JOHN DOLL
*Acting Director of the United States Patent and Trademark Office*